(12) United States Patent
Huang

(10) Patent No.: US 8,238,047 B2
(45) Date of Patent: Aug. 7, 2012

(54) LENS HOLDER

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/980,308

(22) Filed: Dec. 28, 2010

(65) Prior Publication Data

US 2012/0105983 A1 May 3, 2012

(30) Foreign Application Priority Data

Oct. 28, 2010 (TW) .................................. 99136868

(51) Int. Cl.
*G02B 7/02* (2006.01)
(52) U.S. Cl. ........................ 359/819; 359/811; 348/340
(58) Field of Classification Search .................. 359/811, 359/819, 820, 554, 665; 396/55, 529; 348/357, 348/374
See application file for complete search history.

(56) References Cited

U.S. PATENT DOCUMENTS

| | | | | |
|---|---|---|---|---|
| 4,473,274 A * | 9/1984 | Yano et al. | ...................... | 359/824 |
| 6,262,853 B1 * | 7/2001 | Takanashi et al. | ............. | 359/703 |
| 6,469,844 B1 * | 10/2002 | Iwase et al. | .................... | 359/819 |
| 6,661,589 B2 * | 12/2003 | Takanashi et al. | ............. | 359/819 |
| 7,289,282 B2 * | 10/2007 | Matsushima | ................. | 359/819 |
| 7,821,564 B2 * | 10/2010 | Avron et al. | .................. | 348/340 |

* cited by examiner

Primary Examiner — Loha Ben
(74) Attorney, Agent, or Firm — Altis Law Group, Inc.

(57) ABSTRACT

A lens holder for receiving a lens barrel includes a base portion and a barrel portion. The base portion defines a first circular chamber and a second chamber communicating with the first chamber. The first chamber has a diameter equal to an outer diameter of the lens barrel. The second chamber receives an image sensor. The barrel portion extends coaxially from the base portion. The sidewall of the barrel portion defines a number of through slots extending along a direction parallel to the central axis of the barrel portion.

9 Claims, 6 Drawing Sheets

LENS HOLDER

BACKGROUND

1. Technical Field

The present disclosure relates to imaging technologies and, particularly, to a lens holder for a lens module.

2. Description of Related Art

A lens module often includes a barrel for receiving a number of lenses, a holder holding the barrel, and an image sensor supported by the holder to capture the light transmitted through the lenses. The outer wall of the barrel is generally manufactured with an outer screw thread. The inner wall of the holder has a corresponding inner screw thread cooperating with the outer screw thread. Therefore, the barrel can be screwed together with the holder. However, due to some manufacture inconsistencies, which are unexpected and difficult to observe without using test equipment, the barrel and the holder are sometimes difficult to screw together properly. This will lower the quality of the lens module.

Therefore, it is desirable to provide a lens holder for a lens module, which can overcome or at least alleviate the above-mentioned problems.

BRIEF DESCRIPTION OF THE DRAWINGS

Many aspects of the disclosure can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
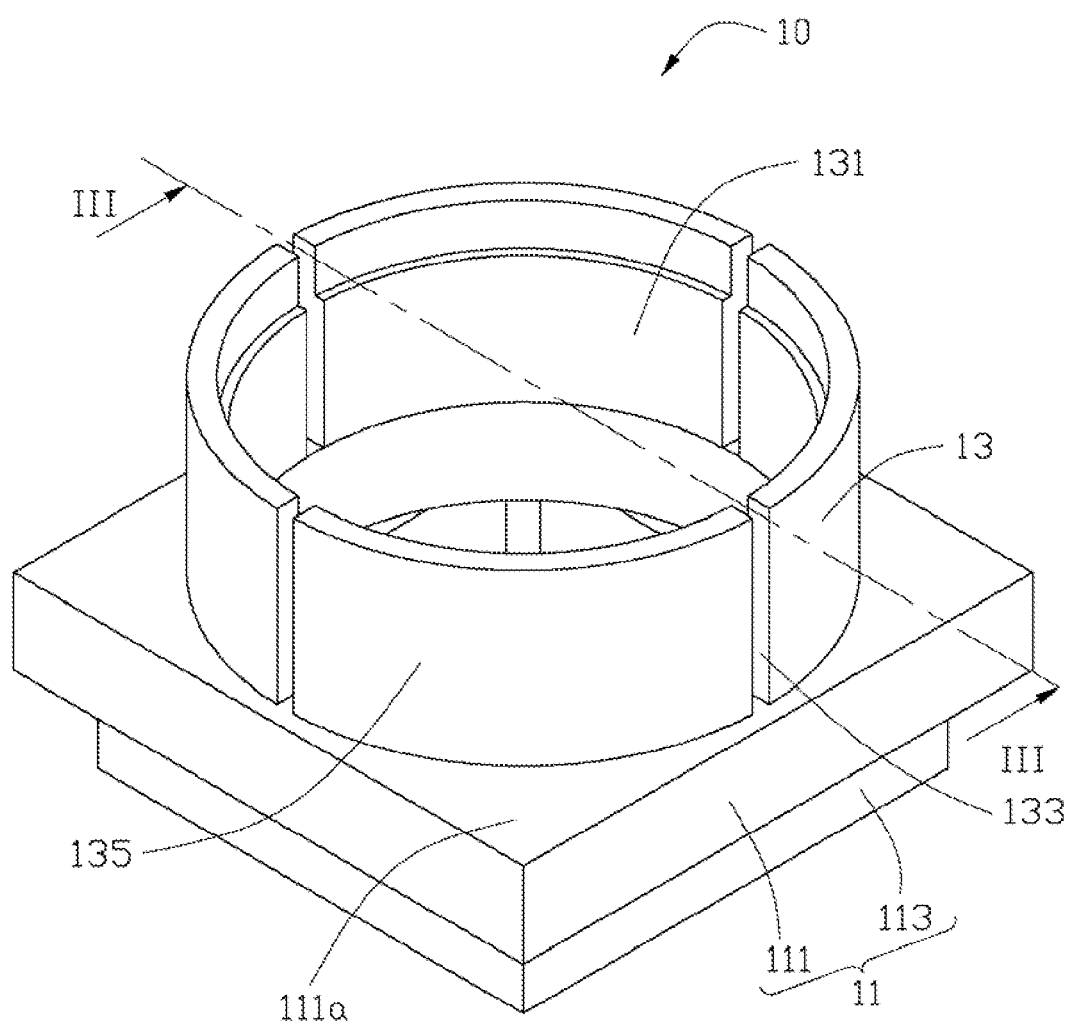
FIG. 1 is a schematic, isometric view of a first embodiment of a lens holder.
Figure 2:
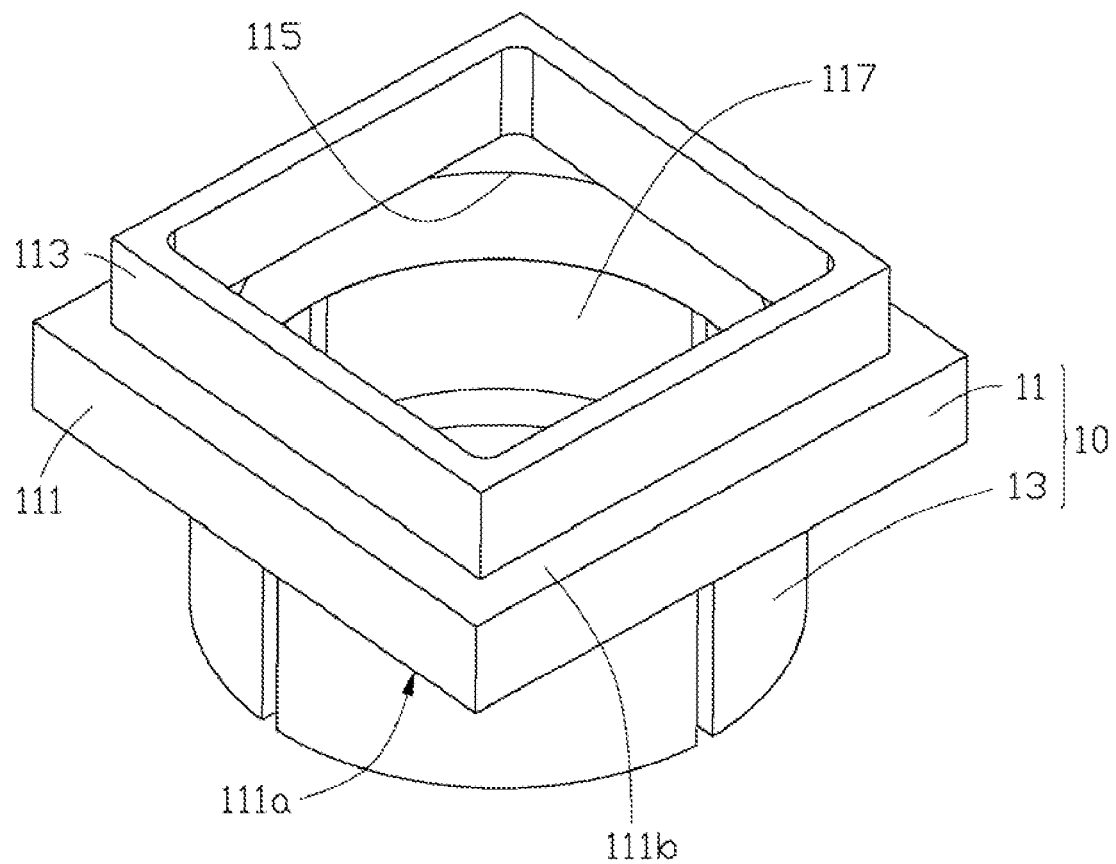
FIG. 2 is similar to FIG. 1, but viewed from another angle.
Figure 3:
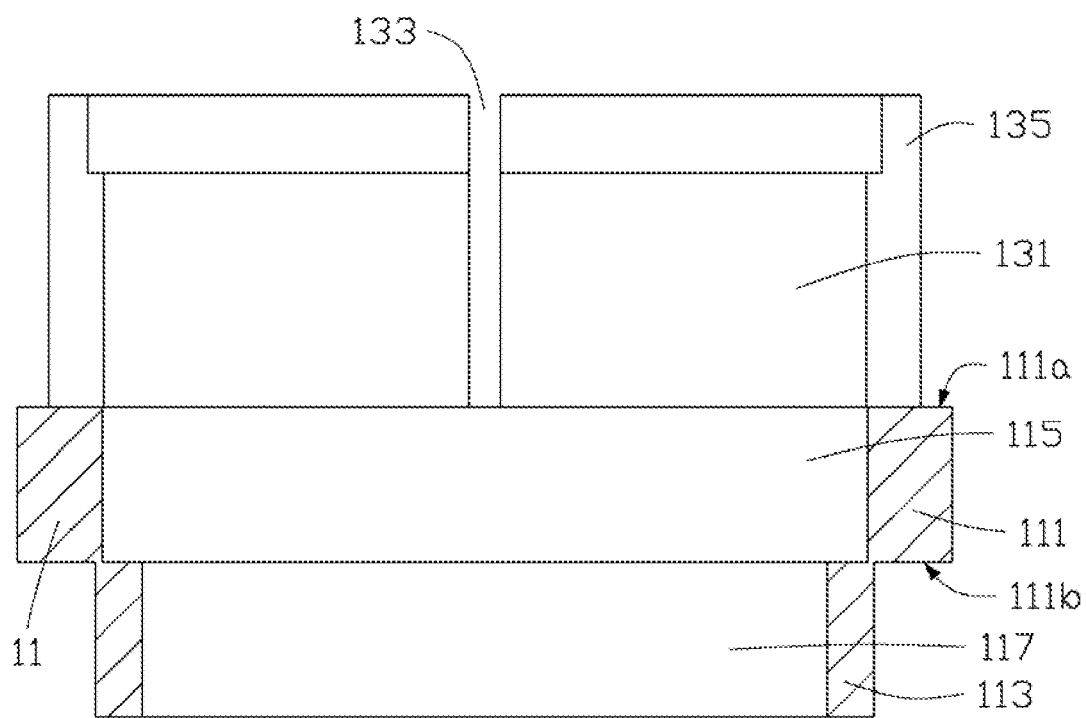
FIG. 3 is a cross-section taken along line III-III of FIG. 1.

Referring to FIGS. 1 to 3, a lens holder 10 in accordance with a first embodiment is shown. The lens holder 10 includes a base portion 11 and a barrel portion 13 extending coaxially and upward from an upper end of the base portion 11. The base portion 11 receives an image sensor. The barrel portion 13 is configured for being internally threaded with a lens barrel 40 (see FIG. 4) which has at least one lens therein. The lens barrel 40 is coaxially received in the barrel portion 13, and threadedly engaged to enable relative axial movement therebetween. The base portion 11 is a hollow cube while the barrel portion 13 is a hollow cylinder.

The base portion 11 includes a first frame 111 and a second frame 113. One end of the first frame 111 is connected to the barrel portion 13 while the other end of the first frame 111 is connected to the second frame 113. In the present embodiment, the side length of the first frame 111 is larger than that of the second frame 113. In detail, the first frame 111 includes an upper surface 111a for fixing the barrel portion 13 and a bottom surface 111b opposite to the upper surface 111a. The first frame 111 defines a first chamber 115 going through the upper surface 111a and the bottom surface 111b. The second frame 113 defines a second chamber 117 communicating with the first chamber 115, for receiving the image sensor therein. The first chamber 115 is a circular shape in the same outer diameter as the lens barrel 40. The first chamber 115 is configured for matching the lens barrel 40 before the lens barrel 40 is received in the barrel portion 13.

The barrel portion 13 defines a third chamber 131 for receiving the lens barrel 40. The diameter of the third chamber 131 is substantially equal to that of the first chamber 115. The inner sidewall of the third chamber 131 defines a number of inner screw threads (not shown) for screwing with the lens barrel 40. In the present embodiment, the barrel portion 13 is made of plastic, which has an elasticity coefficient less than that of the lens barrel 40.

The sidewall of the barrel portion 13 defines four symmetrical through slots 133 extending from the upper surface 111a of the first frame 11 to the distal end of the barrel portion 13, along a direction parallel to the central axis of the barrel portion 13. The four through slots 133 separate the sidewall of the barrel portion 13 into four strips 135. Each strip 135 is arc shaped with a central angle smaller than 90°. When the lens barrel 40 is received in the third chamber 131, the strips 135 contact the sidewall of the lens barrel 40. As such, when the outer diameter of the lens barrel 40 is larger than the inner diameter of the barrel portion 13, the strips 135 may be elastically deformed.

In other embodiments, the through slots 133 can be twist grooves, and there may be only two symmetrical through slots 133 defined on the sidewall of the barrel portion 13, and the through slots 133 may be U-shaped or V-shaped.

Figure 4:
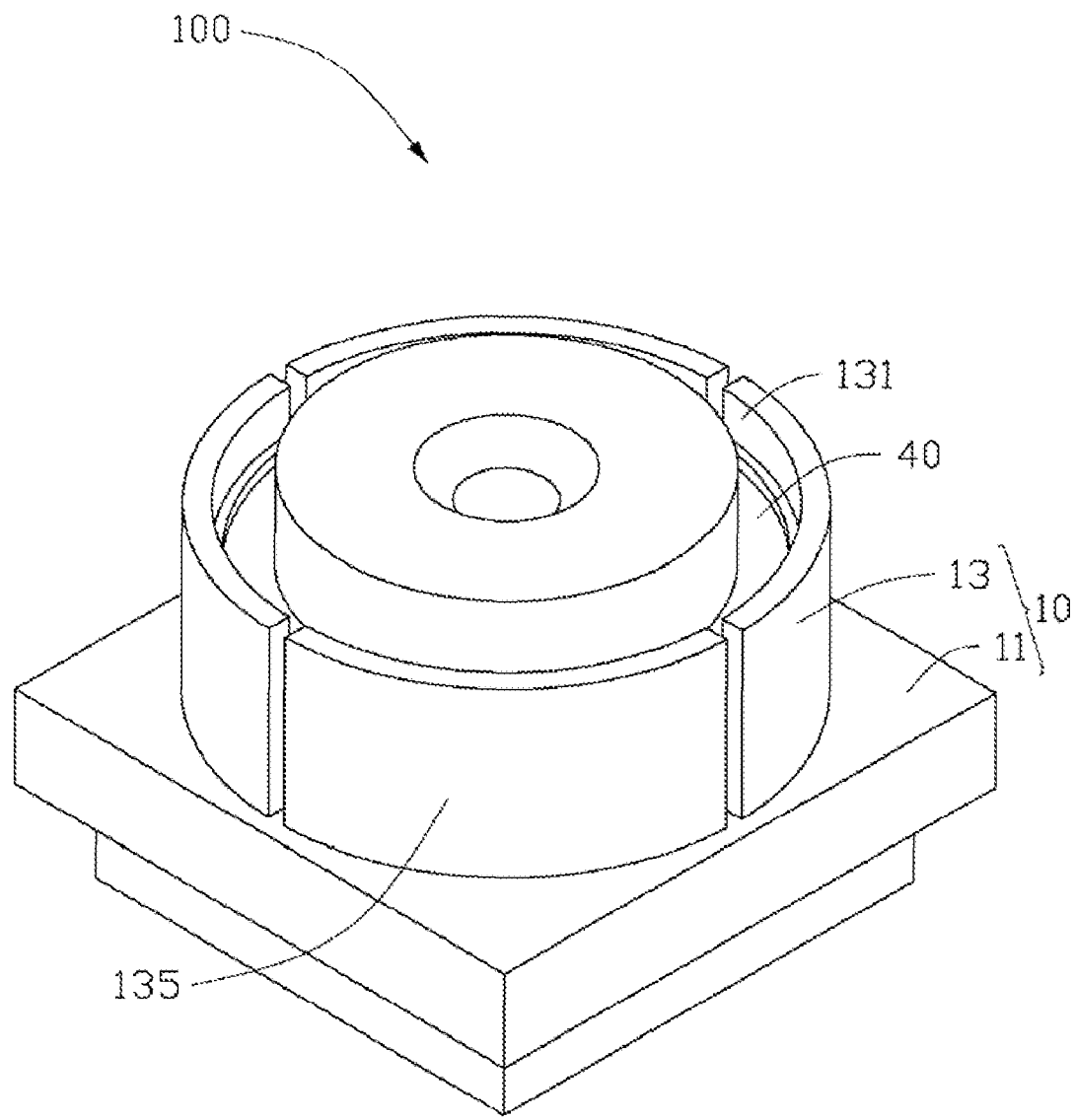
FIG. 4 is a schematic, isometric view of a lens module employing the lens holder of FIG. 1.

Referring to FIG. 4, a lens module 100 employing the lens holder 10 of the first embodiment is provided. The lens module 100 includes the lens holder 10 and the lens barrel 40 received in the lens holder 10.

During assembling of the lens module 100, first the lens barrel 40 is fitted to the first chamber 115, thus a measurement between the lens barrel 40 and the first chamber 115 is established, to determine if the lens barrel 40 can be comfortably received in the first chamber 115. If the outer surface of the lens barrel 40 can be totally attached to the inner surface of the first frame 111, the diameter of the lens barrel 40 is substantially equal to that of the first chamber 115. As such, a proper position between the lens barrel 40 and the first chamber 115 may be determined so the lens barrel 40 can easily slide past the first chamber 115.

Sequentially, the lens barrel 40 will be rotatably screwed into the third chamber 131 of the lens holder 10. In this time, if the lens barrel 40 stretches the lens holder 10 because of improper manufacturing, the lens barrel 40 abuts against the barrel portion 13, and the lens barrel 40 is supported on the strips 135. The screwing force applied on the barrel portion 13 may stretch the strips 135 elastically. That is, the cooperation between the lens barrel 40 and the lens holder 10 can be adjustable, thus the lens holder 10 may hold the lens barrel 40 with elastic deformation, and the lens barrel 40 can easily be screwed into the barrel portion 13.

Figure 5:
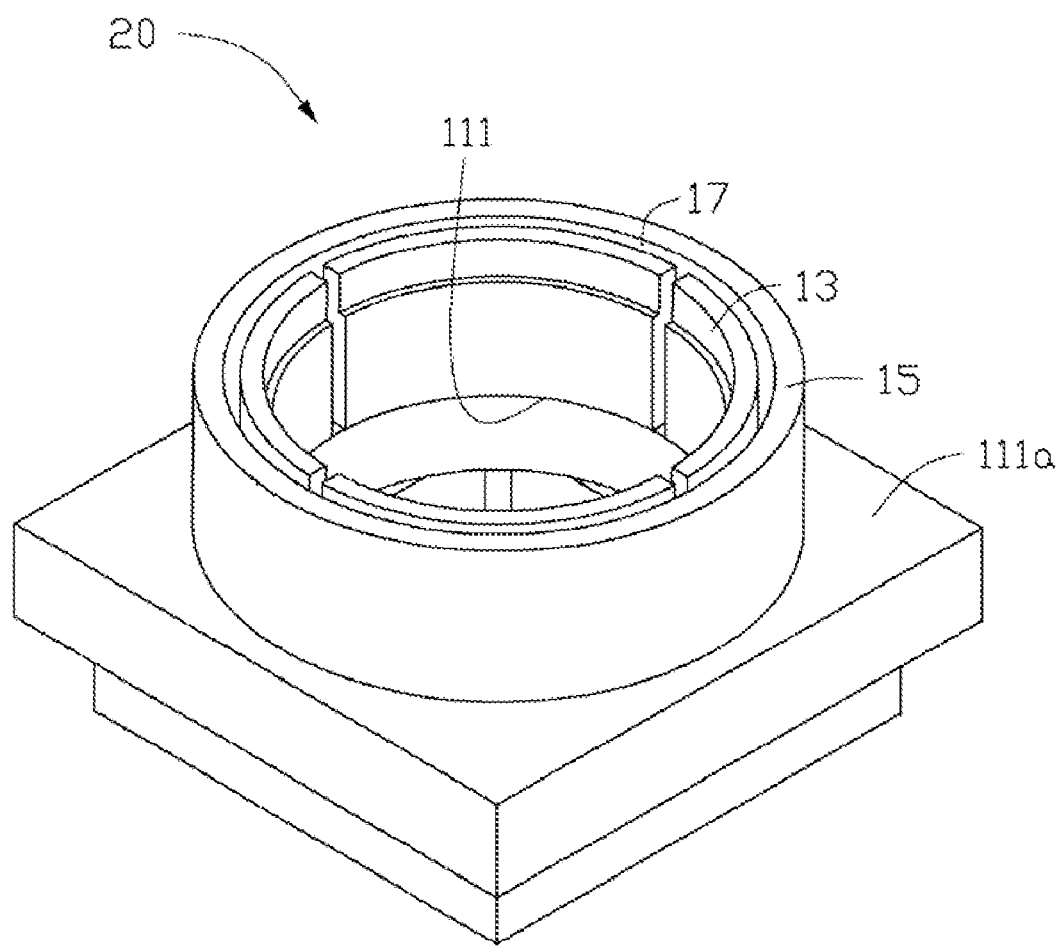
FIG. 5 is a schematic, isometric view of a second embodiment of a lens holder.

Referring to FIG. 5, a lens holder 20 according to a second embodiment is shown. The lens holder 20 of the second embodiment is similar to the lens holder 10 of the first embodiment. The difference is that the lens holder 20 of the second embodiment further includes an annular outer barrel 15 extending coaxially and continuously from the upper surface 111a of the first frame 111, to surround the barrel portion 13. A first gap 17 is defined between the outer surface of the barrel portion 13 and the inner surface of the outer barrel 15. The distance of the first gap 17 is designed to be 0.1 mm to 1 mm in this embodiment. When the barrel portion 13 is jostled by the lens barrel 40 (see FIG. 4), the outer barrel 15 can prevent the barrel portion 13 from deforming beyond the first gap 17.

Figure 6:
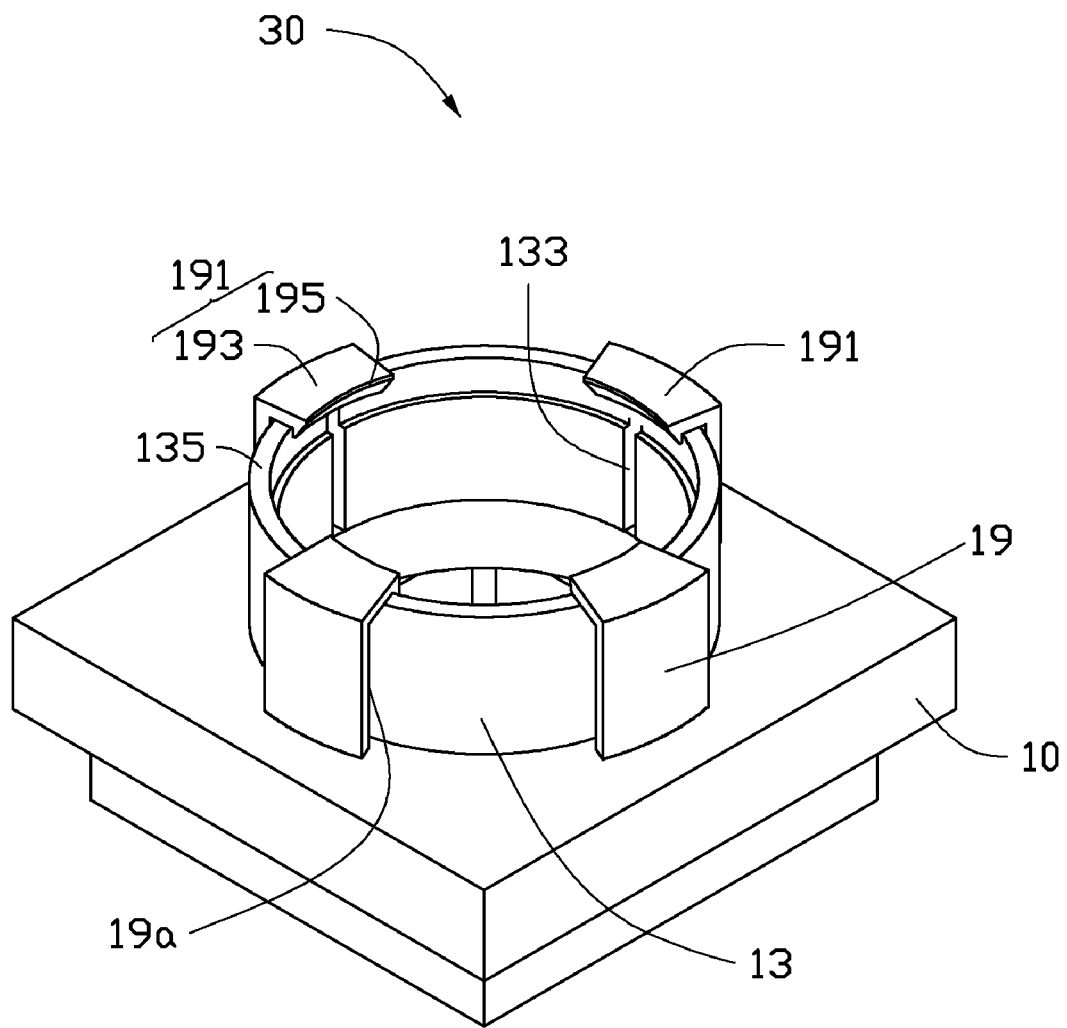
FIG. 6 is a schematic, isometric view of a third embodiment of a lens holder.

Referring to FIG. 6, a lens holder 30 of a third embodiment is similar to the lens holder 20 of the second embodiment, and the difference is that the outer barrel 15 is replaced by four arc-shaped strips 19. The arc-shaped strips 19 are positioned around the barrel portion 13 and cover the through slots 133. A second gap 19a is defined between the outer surface of the barrel portion 13 and the inner sidewall surface of each arc-shaped strip 19.

A fixing end of each arc-shaped strip 19 is located on the base portion 11. A distal end of each arc-shaped strip 19 includes a hook 191. The hook 191 includes a lateral portion 193 extending from the distal end of the arc-shaped strip 19 and a wedge portion 195 connected to the lateral portion 193. The lateral portion 193 and the wedge portion 195 are arranged at an angle of 90 degrees. The lateral portion 193 extends inwards along a radial direction of the barrel portion 13. The wedge portion 195 extends downward from the lateral portion 193, along a direction parallel to the central axis of the barrel portion 13. The wedge portion 195 is engaged between the outer surface of the lens barrel 40 and the inner surface of the barrel portion 13.

When the barrel portion 13 is jostled by the lens barrel 40, the arc-shaped strips 19 can prevent the barrel portion 13 from deforming beyond the distance of the second gap 19a, because the hook 191 can hook the sidewall of the barrel portion 13.

While various embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A lens holder for receiving a lens barrel, comprising:
   a base portion defining a first circular chamber and a second chamber communicating with the first chamber, the first chamber having a diameter equal to an outer diameter of the lens barrel; and
   a barrel portion coaxially extending from the base portion, the sidewall of the barrel portion defining a plurality of through slots extending along a direction parallel to a central axis of the barrel portion.

2. The lens holder as claimed in claim 1, wherein the base portion is a hollow cube while the barrel portion is a hollow cylinder.

3. The lens holder as claimed in claim 1, wherein the base portion comprises a first frame and a second frame, one end of the first frame is connected to the barrel portion while the other end of the first frame is connected to the second frame.

4. The lens holder as claimed in claim 3, wherein the first frame comprises an upper surface contacting the barrel portion and a bottom surface opposite to the upper surface, the first chamber goes through the upper surface and the bottom surface.

5. The lens holder as claimed in claim 4, further comprising an annular outer barrel coaxially extending from the upper surface of the first frame and surrounding the barrel portion.

6. The lens holder as claimed in claim 5, wherein a first gap is defined between an outer surface of the barrel portion and an inner surface of the outer barrel.

7. The lens holder as claimed in claim 6, wherein the distance of the first gap is from 0.1 mm to 1 mm.

8. The lens holder as claimed in claim 4, further comprising a plurality of arc-shaped strips, wherein the arc-shaped strips are arranged around the barrel portion and cover the through slots correspondingly, a second gap is defined between the outer surface of the barrel portion and an inner surface of each arc-shaped strip.

9. The lens holder as claimed in claim 8, wherein each arc-shaped strip comprises a fixing end positioned on the barrel portion and a distal end, the distal end comprises a hook, the hook comprises a lateral portion extending from the distal end and a wedge portion connected to the distal end, the lateral portion extends inwards along a radial direction of the barrel portion, the wedge portion extends downward from the lateral portion along a direction parallel to the central axis of the barrel portion, the wedge portion is positioned between an outer surface of the lens barrel and an inner surface of the barrel portion.

* * * * *